United States Patent [19]

Rogers

[11] 4,411,205
[45] Oct. 25, 1983

[54] SEED PLANTER

[76] Inventor: James T. Rogers, Rt. 1, Box 253, Dover, Fla. 33527

[21] Appl. No.: 431,780

[22] Filed: Sep. 30, 1982

[51] Int. Cl.³ .............................................. A01C 5/04
[52] U.S. Cl. ........................................ 111/1; 47/1 A; 111/34
[58] Field of Search .............. 111/1, 14, 34; 47/1 A; 15/306 B; 221/208, 261, 216, 200, 235; 222/142.1

[56] References Cited

U.S. PATENT DOCUMENTS

| | | | |
|---|---|---|---|
| 2,826,003 | 3/1958 | Oki et al. | 47/1 A |
| 3,571,971 | 3/1971 | Broersma | 47/1 A |
| 3,726,041 | 4/1973 | Ota et al. | 47/1 A |
| 4,072,251 | 2/1978 | Huang | 111/1 X |
| 4,159,727 | 7/1979 | Visser | 47/1 A |

FOREIGN PATENT DOCUMENTS

| | | | |
|---|---|---|---|
| 571084 | 2/1933 | Fed. Rep. of Germany | 47/1 A |
| 3003919 | 8/1981 | Fed. Rep. of Germany | 111/14 |
| 7413671 | 4/1976 | Netherlands | 47/1 A |
| 599962 | 3/1948 | United Kingdom | 47/1 A |

OTHER PUBLICATIONS

Copeland, L. O. (1976) "Chapt. 10; Seed Processing and Handling" *Principles of Seed Science and Technology* Burgess Publishing Co., pp. 252, 253.

*Primary Examiner*—James R. Feyrer
*Attorney, Agent, or Firm*—Duckworth, Allen, Dyer & Pettis

[57] ABSTRACT

A seed planter of the type primarily intended for use in automatically depositing seeds into seedling flats. The seed planter basically comprises a support frame including a conveyor for moving the seedling flats containing a growing medium therealong. Operatively mounted on the support frame in communicating relation to the seedling trays are an automatic dibbler for preparing the growing medium to receive the seeds and a seed delivery station for automatically depositing seeds into the dibbled flat. Operation of the seed planter is entirely automatic, and its operating cycle as well as the structural elements of the dibbler and the seed delivery system may be modified to accomplish automatic planting of flats of various sizes and configurations, and to accomodate seeds of different sizes. In an alternate embodiment, the seed planter further includes a finisher station disposed downstream of the seed delivery system whereby a relatively small quantity of growing medium is placed in the flats above the now-planted seeds.

15 Claims, 12 Drawing Figures

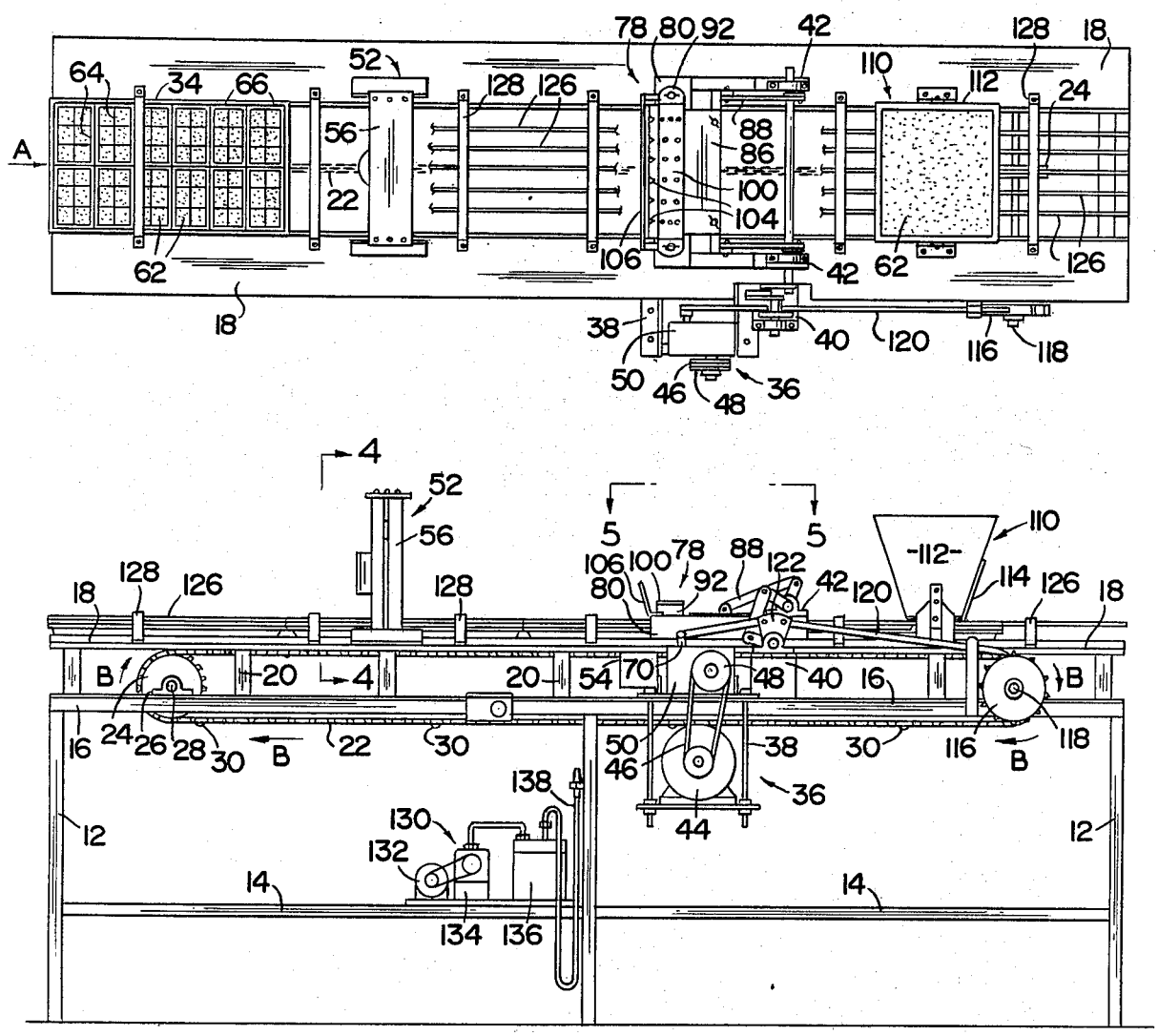
FIG.1
FIG.2
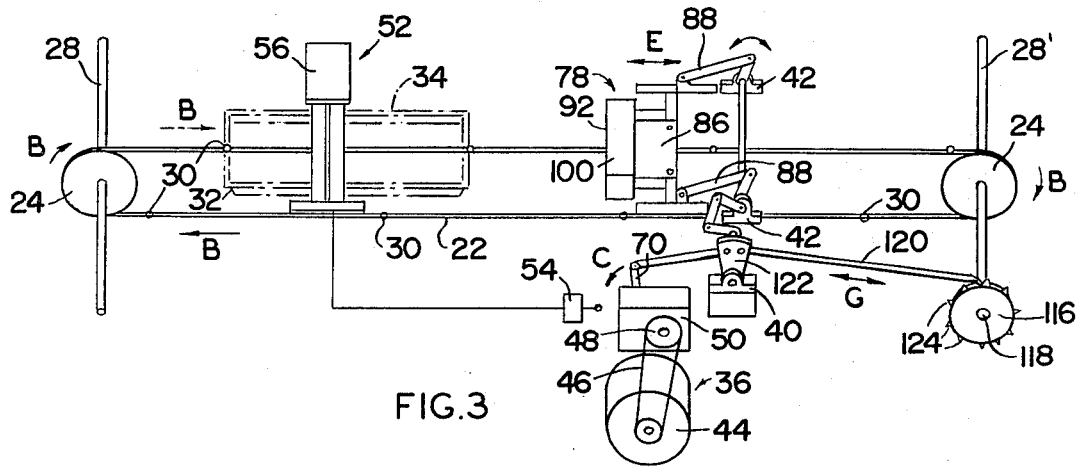
FIG.3

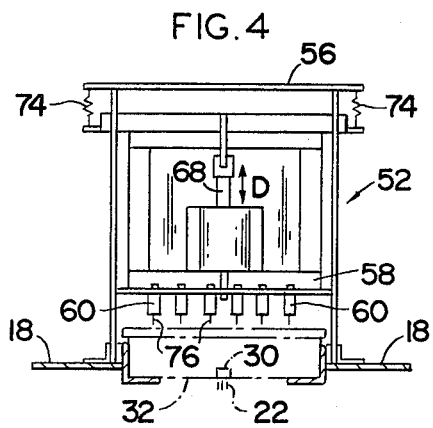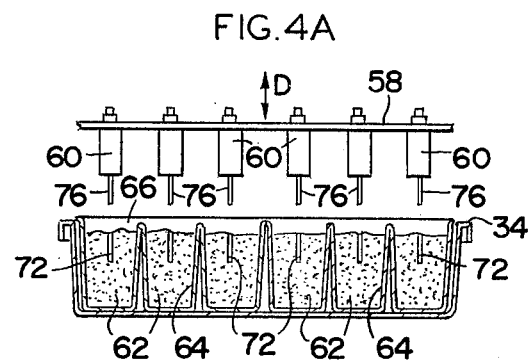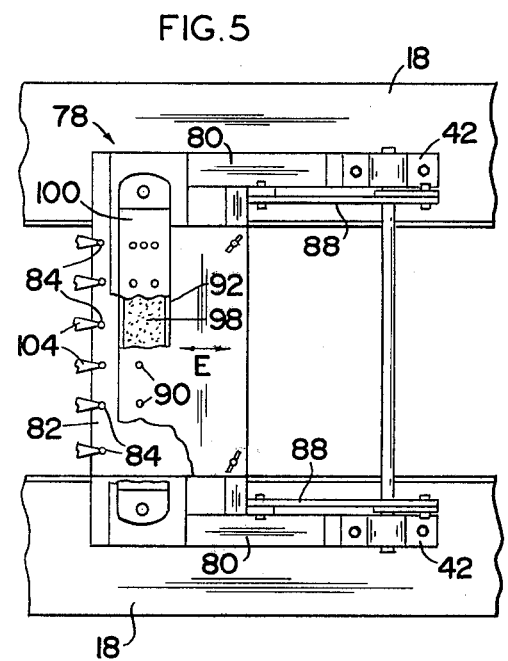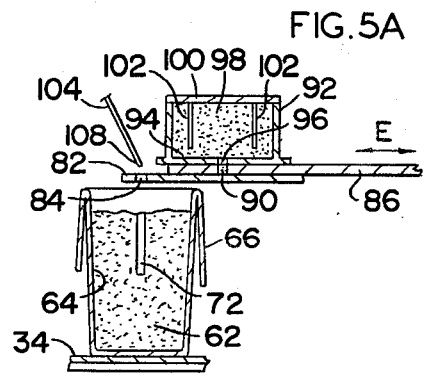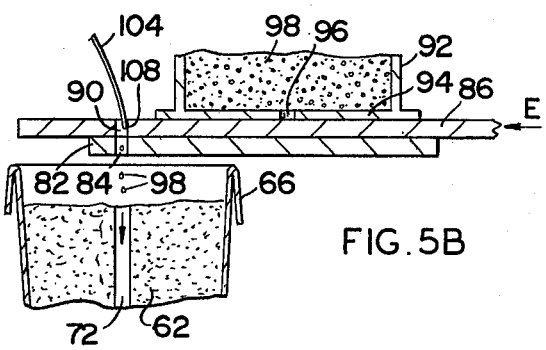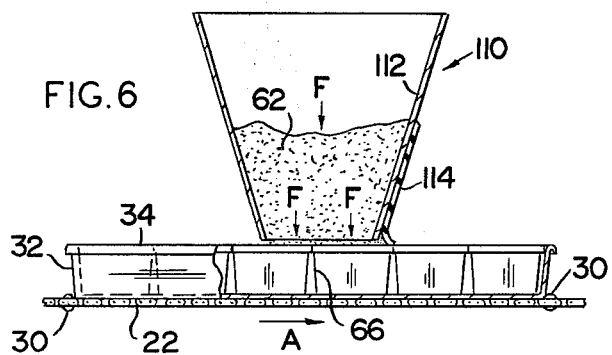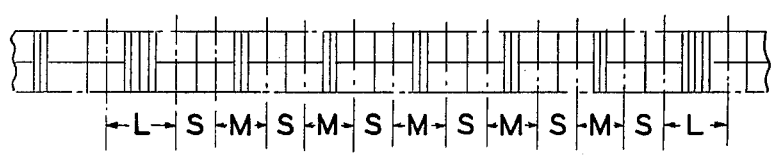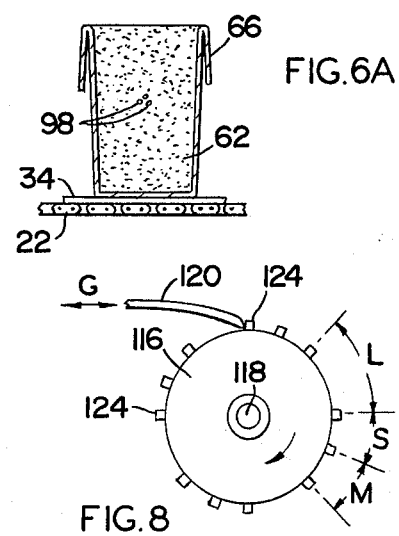

SEED PLANTER

BACKGROUND OF THE INVENTION

1. Field of the Invention

The present invention relates to automatic seed planters of the type primarily intended for use in depositing seeds into standard seedling flats containing a growing medium. The seed planter of this invention is characterized by its provision of both an automatic dibbler and an automatic seed delivery system. The operation of both the dibbler and the seed delivery system is accomplished by a drive means which is adjustable to accommodate seedling flats of various size and configuration, and the cycle of the drive means is timed so as to provide dibbling of one flat while another, downstream flat has already been dibbled receives seeds. Finisher means are also disclosed for the addition of a relatively small quantity of growing medium onto the top of the seedling trays into which seeds have already been planted. Finally, vacuum means are also disclosed for efficiently removing and collecting unused seeds from the seed delivery system.

2. Description of the Prior Art

In the nursery industry, it is common practice to propagate young plants from seeds in seedling trays. While the dimension and configuration of seedling trays may vary, they are usually formed from a plastic material to comprise six individual compartments in two rows of three, each. It is further common practice to place twelve (12) of the trays in a carrier compartment for ease in planting, storing, and delivering to the wholesale customer. A significant cost of operating a seedling nursery involves the time and labor spent in preparing seedling trays for placement of the seeds therein. Not only is this operation lengthy, and therefore expensive when the seeds are deposited by hand, but also operating costs are invariably increased because of the inefficient delivery of the seeds to the flats by human operators. In this regard, it is to be noted that many of the seeds are of extremely small size such as, for example, petunia seeds.

Not surprisingly, then, automatic planting devices for delivering seeds to seedling flats have been developed and are known both in prior patent literature and in commerical use. For example, U.S. Pat. No. 4,106,414 to Vastag discloses an automatic seed-planting valve as an element of a seed planter for placing seeds in nursery flats. The invention comprises means for alternately applying vacuum and atmospheric pressure for individual seed application. A somewhat similar, air pressure device is disclosed in U.S. Pat. No. 3,738,530 to Fine. Other pressure-operated seed planters are also disclosed in U.S. Pat. No. 3,627,173 to Kerker and U.S. Pat. No. 3,986,638 to DeHart.

A conveyor belt-type automatic seed planting machine is disclosed in U.S. Pat. No. 4,010,778 to Aggen. According to the disclosure of the Aggen patent, seeds are delivered from a reservoir onto a first conveyor. From the first conveyor the seeds are then deposited onto a second conveyor moving at a speed greater than that of the first. The speed differential causes the seeds to become spaced apart one from another, and they are delivered from the second, faster conveyor onto the seed bed. U.S. Pat. No. 4,164,190 to Newman discloses a trailer-towed device including a roller which will form an array of shallow holes in the seed bed, followed by an array of seed delivery tubes for dropping seeds into the shallow holes formed by the roller. A similar implement is taught in the earlier U.S. Pat. No. 1,914,915 to Handler. In Wendt's U.S. Pat. No. 4,046,285 an apparatus is disclosed for diverting a supply of grains into a plurality of substantially parallel intermittent single flows of grain as for sowing one seed in each one of a number of plant growing pots. Finally, U.S. Pat. No. 4,072,251 to Huang discloses means used in combination with an automatic seed planter for singulating individual seeds from a reservoir and dispensing each seed into individual soil pots or cubes. Obviously, other automatic seed planting devices are known in the prior art, but those discussed above are believed to represent accurately the current state of the art. As one can immediately determine from a review of such prior art patents and currently available devices, significant limitations are present. For example, while certain ones of the prior art devices are certainly suitable for use in planting a field, because of their size and construction they would be of virtually no value in planting nursery seedling flats. Of the prior art devices which would be useful for planting seedling flats, almost all of them are relatively complex in that they rely upon pressure differentials for obtaining, placing and depositing the seeds. This is apparently a result of the heretofore unsolved problems associated with purely mechanical delivery of seeds by gravity. While the above patent to Huang does appear to address this problem, his solution is also relatively complex in that it requires a pair of independently reciprocating plates.

Accordingly, it is clear that there is a great need in the art for an efficient, reliable yet relatively simple means for planting nursery flats. Such a device would preferably prepare the flat for reception of the seed as by dibbling a receptacle into the growing medium placed within the flat, would then deliver seed to each prepared compartment of the flat, and would "top dress" the flat with additional growing medium. The construction of such a seed planter should be relatively simple and durable so that it could be operated by unskilled labor and would not require extensive preventive maintenance. Finally, and perhaps most importantly, it would also be desirable for such an automatic seed planter to be adjustable both with regard to the size and configuration of the seedling trays and with regard to the physical characteristics of the seed to be planted.

SUMMARY OF THE INVENTION

The present invention relates to an automatic seed planter of the type primarily intended for use in depositing seeds into nursery seedling flats including a growing medium. The seed planter comprises a support frame including conveyor means mounted thereon for transporting a series of flats along the longitudinal dimension of the top of the frame. Drive means, which are preferably electrically operated, are mounted on the frame and operatively connected to the conveyor. The seed planter further comprises a dibbler means mounted on the frame above the conveyor means and operatively connected to the drive means, whereby each compartment of a seedling flat will be dibbled to form a receptacle in the growing medium for the seed to be planted.

Downstream of the dibbler means is mounted a seed delivery means. The seed delivery means is similarly attached to the frame above the conveyor means and is operatively connected to the drive means. Once a flat has been dibbled, it will pass under the seed delivery means and will momentarily stop, as controlled by the drive means, during which pause seed will be delivered into each prepared compartment of the seedling flat.

Though not deemed critical to the scope of this invention, the seed planter may further comprise a finisher means mounted on the support frame above the conveyor downstream of the seed delivery means. The finisher means basically comprises a container for a quantity of growing medium having an aperture at the bottom thereof in communicating relation to the top of the seedling flats, and a wiper bar disposed downstream of the finisher aperture in juxtaposition to the top of the seedling flats whereby the planted compartment is top dressed with an additional quantity of growing medium over the seed and then smoothed by the wiper bar.

The invention may further comprise vacuum means useful for removing and collecting seeds from the seed delivery means when it is desired to secure operation of the seed planter, or to change the variety of seed being planted. While the provision of vacuum means may at first blush appear to be relatively unimportant, one must only consider the cost of, for example, petunia seeds to appreciate its commercial value.

Though not deemed critical to the efficient operation of the seed planter, it has been found desirable to provide a plurality of guide rails both along and over the support frame to insure smooth, orderly movement of the seedling flats by the conveyor through the work stations defined by the dibbler means, the seed delivery means, and if desired the finisher.

One significant aspect of the seed planter of this invention is its utilization of a single drive means for operating the conveyor, the dibbler means and the seed delivery means. While, as previously stated, the drive means preferably comprises an electric motor, it further comprises a timing wheel connected in driving relation to the conveyor which is preferably an endless chain. The flat pushers are operatively mounted on the conveyor chain so as to engage a portion of a flat sidewall, and the flat pushers are spaced one from another at predetermined intervals corresponding to the longitudinal dimension of a flat unit array. While the electric motor of the drive means operates continuously, movement of the conveyor chain is intermittent in response to the action of a pawl arm on individual ones of a plurality of dogs extending radially from the circumference of the timing wheel by which the chain conveyor is driven. The spacing between adjacent ones of the dogs is predetermined in accord with the spacing between rows of compartments (with respect to the direction of travel) of the seedling flats. Inasmuch as this distance may vary from row to row, so may the distance from dog to dog on the timing wheel. The result of this construction is that the seedling flats operatively placed on the conveyor belt will move intermittently as the pawl arm engages a particular dog causing the timing wheel to turn to advance the conveyor chain.

During the interval when the conveyor chain, and therefore the seedling flats, are not moving, the drive means will actuate the dibbler means to form receptacles in one row of seedling plant compartments, while the seed delivery means will be actuated to deposit seeds into a prepared, downstream row of compartments in another tray. It should also be noted that inasmuch as the incremental distance traveled by each tray is determined by the relative spacing between dogs on the timing wheel, different size trays can be accommodated by the seed planter of this invention simply by changing the timing wheel.

While a detailed description of a preferred embodiment of the seed delivery means of this invention will be presented hereinafter, it should be noted at this time that the delivery means is gravity-operated and that substantial singulation of seeds is accomplished by the construction of the seed delivery means to comprise, inter alia, a single reciprocating transfer plate. The seeds to be planted are placed within a hopper at the top of the seed delivery means, from which they may pass to an aperture formed through the reciprocating transfer plate.

In a first position of the transfer plate, as determined by mechanical linkage between the plate and the drive means, the transfer apertures will be positioned below the hopper. The thickness of the transfer plate and the dimension of the transfer aperture is predetermined to correspond to the variety of seed being planted. Then, in response to continued actuation of the drive means, the transfer plate will move to a second position defined by registry of the transfer apertures with corresponding delivery apertures formed through a fixed delivery plate juxtaposed immediately below the transfer plate. Gravity causes the seeds to fall from the transfer apertures, through the delivery apertures, and into the receptacles previously formed by the dibbler means. When it is desired to plant seeds of a substantially different size from those presently in the hopper of the seed delivery means, all that is required is to empty and refill the hopper, or change hoppers, and install a second transfer plate including transfer apertures corresponding to the second seed variety.

Inasmuch as seed planters are frequently operated in relatively harsh environments such as, for example, fields or greenhouses of relatively high humidity, it has been observed that under some operating conditions the seeds will tend to "stick" within the transfer apertures. For the purpose of alleviating this sporadic problem, the seed delivery means of this invention may further comprise a plurality of guide fingers, each including a distal end disposed in spaced apart registry with one of the delivery apertures and disposed in engaging registry with one of the transfer apertures when the transfer plate is in its second position. Thus, the distal end of each guide finger will tend to expel the seed from its transfer aperture.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a top plan view of the seed planter.

FIG. 2 is a side elevational view of the seed planter shown in FIG. 1.

FIG. 3 is a perspective schematic representation of the seed planter.

FIG. 4 is a fragmentary detail of the dibbler means taken along line 4—4 in FIG. 2.

FIG. 4A is a further fragmentary detailed view of the dibbler means shown in FIG. 4.

FIG. 5 is a fragmentary detail of the seed delivery means taken along line 5—5 of FIG. 2.

FIG. 5 A is a fragmentary detailed view of the seed delivery means with the transfer plate in its first position.

FIG. 5 B is a fragmentary detailed view of the seed delivery means with the transfer plate in its second position.

FIG. 6 is a fragmentary view of the finisher means.

FIG. 6 A is a sectional view of one compartment of a seedling flat which has been dibbled, planted and finished by the seed planter of this invention.

FIG. 7 is a schematic, fragmentary plan view of a seedling flat array depicting the variable longitudinal dimension between adjacent rows of seedling flat compartments.

FIG. 8 is a detailed view of the drive means timing wheel and pawl arm illustrating the variable distance between adjacent ones of the timing wheel dogs.

Similar reference characters refer to similar parts throughout the several views of the drawings.

DETAILED DISCUSSION

The automatic seed planter of this invention is generally indicated as 10 throughout the several views of the drawings. As best seen in the view of FIG. 2, seed planter 10 comprises a support frame including legs 12, braces 14, lower frame 16, top 18, and top supports 20 disposing top 18 in spaced apart relation to lower frame 16. A conveyor means comprising an endless chain 22 passing around idler sprockets 24 is mounted onto the support frame as by bearing brackets 26 disposed at each end of the shaft 28 around which each sprocket 24 turns being fixed to lower frame 16. As seen in the views of FIGS. 2, 4 and 6, chain 22 further includes a plurality of flat pushers 30 mounted therealong in predetermined spaced relation to each other and disposed in engaging relation to a wall 32 of a flat tray 34 placed on top 18 for movement therealong as indicated by directional arrow A. The rotation of idler sprockets 24 and associated movement of chain 22 is indicated by directional arrows B. The driving force for sprockets 24 and chain 22 is provided through downstream shaft 28' in response to the drive means generally indicated at 36 and explained in greater detail hereinafter.

Drive means 36 is mounted on the support frame as by carriage 38 fixed to one side of lower frame 16, main support 40 also fixed to lower frame 16, and second supports 42 mounted on top 18.

In this preferred embodiment the drive means 36 comprises an electric motor 44 connected by belt 46 to drive pulley 48 of reduction gear 50.

A dibbler means generally indicated as 52 is mounted on top 18 of the support frame and is operatively connected to drive means 36 by switch 54, best seen in the view of FIG. 3. Dibbler means 52 comprises a dibbler frame 56 mounted in substantially transverse relation to top 18 of the support frame and extending upwardly therefrom. As best seen in the views of FIGS. 4 and 4 A, dibbler means 52 further comprises a dibbler bar 58 movably attached to frame 56 and a plurality of dibbler tips 60 attached to bar 58 and extending therefrom in operative relation to growing medium 62 placed within individual compartments 64 of flats 66 carried by flat tray 34.

As best seen in the view of FIG. 4, dibbler means 52 further comprises a piston means 68 mounted in interconnecting relation between dibbler frame 56 and dibbler bar 58. Tripping of switch 54 by movement of first lever 70 operatively connected to reduction gear 50 in the direction of arrow C will energize piston means 68 resulting in downward motion of bar 58 and the dibbler tip 60 attached thereto in a downward direction so as to form a depression 72 within the growing medium 62. Substantially immediate return of the bar 58 is accomplished by the action of biasing means 74. Thus, dibbler bar 58 and dibbler tips 60 are caused to move up and down as indicated by directional arrow D. At this point it should be noted that while the drawings depict dibbler tips 60 including elongated rods 76 the scope of this invention is not to be limited thereby. The configuration of tips 60 may be virtually any desired with regard to the receptacle to be formed within the growing medium 62. For example, tips 60 may define substantially cone-shaped distal ends.

Seed planter 12 further comprises seed delivery means generally indicated as 78 and thus seen in the views of FIGS. 5, 5 A and 5 B. The seed delivery means 78 comprises a seed frame 80 mounted in substantially transverse relation to top 18 of the support frame. A delivery plate 82 is mounted on seed frame 80 in substantially parallel, spaced apart relation to top 18. A plurality of delivery apertures 84 are formed through delivery plate 82 such that each delivery aperture 84 will be in substantial registry with a corresponding depression 72 formed in the growing medium 62 within each tray compartment 64. A transfer plate 86 is movably mounted in juxtaposition above delivery plate 82, and transfer plate 86 is operatively connected to the drive means 36 through links 88 or reciprocal movement as indicated by directional arrows E. A plurality of transfer apertures 90 are formed through transfer plate 86 so as to be in substantial registry with the corresponding one of the delivery apertures 84 when transfer plate 86 is moved from a first position as illustrated in FIG. 5 A to its second position as illustrated in FIG. 5 B.

The seed delivery means 78 further comprises a seed hopper 92 mounted on seed frame 80 above transfer plate 86. As best seen in the view of FIG. 5 B, bottom 94 of seed hopper 92 is apertured as at 96 so as to permit delivery of seeds 98 into transfer apertures 90 when transfer plate 86 is in its first position. A cover 100 is provided for seed hopper 92, and a plurality of pins 102 extend inwardly from cover 100 whereby seeds 98 will be agitated by vibration resulting from the reciprocal movement of transfer plate 86.

The seed delivery means 78 further comprises a plurality of guide fingers 104 mounted on frame 80 as by bar 106, and as best seen in the view of FIG. 5 A, a distal end 108 of each of the fingers 104 is disposed in spaced apart registry with a corresponding one of the delivery apertures 84. When the transfer plate 86 is moved to its second position as shown in the view of FIG. 5 E, distal ends 108 will register with a corresponding one of the transfer apertures 90 to assist in causing seeds 98 to fall from transfer plate 86 through delivery aperture 84 into depression 72. Thus, guide fingers 104 are preferably formed from a flexible material and normally biased downward toward transfer plate 86 and delivery plate 82.

At this point it should be noted that the thickness of transfer plate 86 and the dimension of transfer apertures 90 are both predetermined with relation to the size and variety of seed 98 to be planted. When it is desired to change from one seed variety to another, efficient operation of seed planter 10 may be insured simply by making a corresponding change of transfer plate 86.

As perhaps best seen in the views of FIGS. 6 and 6 A, seed planter 10 may further comprise a finisher means generally indicated as 110. Finisher means 110 is mounted on top 18 of the support frame above the conveyor downstream of seed delivery means 78. The finisher means 110 comprises a container 112 including a further quantity of growing medium 62. The bottom of container 112 is open so that growing medium 62 may be deposited onto the top of flats 66 passing thereunder, as indicated by directional arrows F. The finisher means 110 further comprises a wiper bar 114 disposed downstream of the container 112 in juxtaposition to the top of flats 66, whereby the surface of the growing medium 62 will be smoothed as flats 66 exit the seed planter 10, and as is indicated in the view of FIG. 6 A.

Returning now to drive means 36, attention is invited to the view of FIG. 8. As shown therein the drive means 36 further comprises a timing wheel 116 connected in driving relation to chain 22 by mounting timing wheel 116 at end 118 of shaft 28'. A pawl arm 120 is operatively connected to drive means 36 through eccentric link 122 and accordingly reciprocates as indicated by directional arrow G. A plurality of dogs 124 extend radially from the circumference of timing wheel 116, and an individual one of said dogs 124 will be engaged and turned by the end of pawl arm 120 on its forward stroke. This will result in rotation of timing wheel 116 as indicated by direction arrow B, corresponding to the direction of travel of chain 22. On the backstroke of pawl arm 120, its distal end will position itself for operative engagement with the next of the dogs 124.

With particular regard to the views of FIGS. 7 and 8, attention is invited to the fact that the spatial relation between adjacent ones of the dogs is determined by the size and configuration of the seedling flat array carried within the flat tray 34. Certain pairs of dogs 124 are relatively close to each other as indicated by the letter "S." Others of the dogs 24 are relatively far apart as indicated by the letter "L." Yet other pairs of dogs 124 are of a medium distance one from the other as indicated by the letter "M." The letter designations in FIG. 8 correspond to the same designations in the schematic representation of FIG. 7. The letter "S" represents the relatively short distance of travel required when moving from one compartment 64 to an adjacent compartment 64 within the same flat 66. The letter "M" represents the relatively medium distance required when moving from one compartment 64 of one flat 66 to another compartment 64 of another flat 66. Finally, the letter "L" represents the relatively long distance required when moving from one compartment 64 within a flat 66 carried by one flat tray 34 to another compartment 64 of a different flat 66 carried within a different flat tray 34. Accordingly, should it become necessary to vary the size and configuration of flats 66 or flat trays 34, the seed planter 10 may be set to accommodate the new sizes by changing the timing wheel 116. Of course, it is to be understood that comparable alteration of the dibbler means 52 and the seed delivery means 78 might also be required.

Returning to the views of FIGS. 1 and 2, it can be seen that the speed planter 10 may further comprise a plurality of guide rails 126 mounted on top 18 as by brackets 128 for the purpose of insuring the orderly transportation of flat trays 34 along the longitudinal dimension of seed planter 10. However, guide rails 126 and their associated brackets 128 are not deemed critical to the scope of the invention.

For the purpose of quickly and efficiently removing seeds 98 from within seed hopper 92, the seed planter 10 may further comprise vacuum means generally indicated as 130 in the view of FIG. 2. Vacuum means 130 comprises a motor 132 connected in driving relation to a compressor 134 which in turn is operatively connected to a collector 136. A hose 138 extends from collector 136 and may be used for vacuuming seeds 98 from hopper 92. Seeds 98 may then be removed from collector 136 for subsequent use.

Having thus set forth a preferred construction for seed planter 10, certain features of its operation are apparent. Inasmuch as the dibbler means 52, the seed delivery means 78, and the conveyor chain 22 are all driven by drive means 36, operation of the seed planter 10 is both coordinated and continuous. The timing wheel 116 provides intermittent movement of flat trays 34 along top 18 of the seed planter as previously described. During each pause of conveyor chain 22, switch 54 will be actuated to cause dibbling of one row of flats 66 while, substantially simultaneously, links 88 will cause reciprocal movement of transfer plate 86 to deliver seeds 98 to a downstream row in another of the flats 66. Then, as pawl arm 120 moves forwardly to cause further travel of chain 22 dibbler means 52 will return to its up position, transfer plater 86 will return to its first position, and finisher means 110 will top dress yet another downstream row of compartments 64.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. An automatic seed planter of the type primarily intended for depositing seeds into prepared growing medium in a seedling flat, said seed planter comprising: a support frame including conveyor means mounted thereon for transporting a seedling flat along the longitudinal dimension of the top of said frame; drive means mounted on said frame and operatively connected to said conveyor means; dibbler means mounted on said frame above said conveyor means and operatively connected to said drive means, whereby a seedling flat containing growing medium may pass under said dibbler means and said dibbler means will be actuated by said drive means to prepare a receptacle in the growing medium for seed; and seed delivery means mounted on said frame above said conveyor means downstream of said dibbler means, said seed delivery means comprising a seed frame mounted in substantially transverse relation to said top of said support frame; a delivery plate mounted on said seed frame in substantially parallel, spaced apart relation to said top of said support frame and including a plurality of delivery apertures formed through said delivery plate, each one of said plurality being in substantial registry with a receptacle prepared by said dibbler means; a transfer plate movably mounted in juxtaposition above said delivery plate and including a corresponding plurality of transfer apertures formed therethrough, each one of said plurality being in substantial registry with a corresponding one of said delivery apertures when said transfer plate is moved from a first position to a second position, said transfer plate being operatively connected to said drive means for reciprocal movement with respect to the longitudinal dimension of said support frame top; a seed hopper mounted on said seed frame above said transfer plate, the bottom of said hopper communicating with the top of said transfer plate such that said first position is defined by placement of said transfer apertures beneath said hopper bottom and said second position is defined by placement of said transfer apertures in registry with said delivery apertures; and said seed delivery means further comprising a plurality of guide fingers mounted on said seed frame in substantially transverse relation to said support frame top, each of said plurality of guide fingers including a distal end disposed in spaced apart registry with one of said delivery apertures and disposed in engaging registry with one of said transfer apertures when said transfer plate is in its second position, whereby each one of said distal ends will assist in causing a seed carried within a corresponding one of said transfer apertures to fall therefrom, through the corresponding one of said delivery apertures, and into the receptacle prepared in the seedling flat by said dibbler means.

2. A seed planter as in claim 1 wherein said conveyor means comprises a chain including a plurality of flat pushers mounted therealong in predetermined spaced relation to each other, each one of said plurality of pushers being disposed to engage a portion of a flat sidewall to cause each flat to move along said frame.

3. A seed planter as in claim 2 wherein said drive means comprises a timing wheel connected in driving relation to said chain and pawl arm engageable with said timing wheel to cause movement of said chain at predetermined times and for predetermined distances.

4. A seed planter as in claim 3 wherein said timing wheel comprises a plurality of dogs extending radially from the circumference thereof in predetermined spaced relation from each other, the distal end of said pawl arm engaging individual ones of said dogs seriatim when said drive means is actuated.

5. A seed planter as in claim 4 wherein the spatial relation between adjacent ones of said dogs is determined by the size and configuration of the seedling flat to be planted.

6. A seed planter as in claim 1 wherein said dibbler means comprises a dibbler frame mounted in substantially transverse relation to said top of said support frame and extending upwardly therefrom; a dibbler bar movably attached to said dibbler frame; and a plurality of dibbler tips attached to said dibbler bar in operative relation to growing medium placed within a seedling flat, whereby actuation of said drive means will cause said dibbler tips to form a depression in the growing medium.

7. A seed planter as in claim 6 wherein said dibbler means further comprises piston means disposed in interconnecting relation between said dibbler frame and said dibbler bar and switch means operatively connecting said piston means to said drive means, whereby actuation of said drive means will energize said switch means to move said dibbler bar and said dibbler tips attached thereto.

8. A seed planter as in claim 7 wherein said dibbler means further comprises biasing means disposed in interconnecting relation between said dibbler frame and said dibbler bar, said biasing means normally urging said dibbler bar away from said top of said support frame.

9. A seed planter as in claim 1 wherein said seed hopper comprises a cover including a plurality of pins extending inwardly therefrom, whereby seeds placed within said seed hopper will be agitated by vibration resulting from the reciprocal movement of said transfer plate.

10. A seed planter as in claim 1 wherein the thickness of said transfer plate and the dimension of each of said transfer apertures are determined by the size of the seeds placed within said seed hopper to be planted.

11. A seed planter as in claim 1 further comprising finisher means mounted on said frame above said conveyor means downstream of said seed delivery means, whereby a quantity of growing medium is deposited over the seeds placed into the seedling flats.

12. A seed planter as in claim 11 wherein said finisher means comprises a container for growing medium and an aperture disposed in communicating relation to the top of seedling flats being moved thereunder by said conveyor means, and a wiper bar disposed downstream of said finisher aperture in juxtaposition to the top of the seedling flats, whereby the surface of the growing medum will be smoothed as the flats exit said seed planter.

13. A seed planter as in claim 1 further comprising a plurality of guide rails mounted on said frame above said conveyor means, the distance between said rails and said frame and conveyor means being sufficient to permit passage of seedling flats therethrough.

14. A seed planter as in claim 1 further comprising vacuum means for removing seeds from said seed delivery means when the operation of said seed planter is to be secured.

15. A seed planter as in claim 14 wherein said vacuum means comprises a collector for the removed seeds.

* * * * *